United States Patent
Ginsburgh et al.

[15] 3,642,036
[45] Feb. 15, 1972

[54] AUTOMATIC FUELING SYSTEM FOR AUTOMOBILES

[72] Inventors: Irwin Ginsburgh, Morton Grove; Eugene Runes, Chicago Heights, both of Ill.

[22] Filed: Apr. 30, 1970

[21] Appl. No.: 33,308

[52] U.S. Cl..................................................141/94, 141/284
[51] Int. Cl...........................................B65b 1/30, B67c 3/00
[58] Field of Search.............................141/84, 98, 100–107, 141/250–284, 311, 387–392; 250/203, 221, 222

[56] References Cited

UNITED STATES PATENTS

| | | | |
|---|---|---|---|
| 2,993,997 | 7/1961 | McFarlane | 250/203 |
| 2,448,039 | 8/1948 | Lynn | 250/221 |
| 3,439,357 | 4/1969 | Gibaja | 250/221 |
| 3,536,925 | 10/1970 | Schmidt | 250/222 |
| 3,536,109 | 10/1970 | Ginsburgh et al | 141/98 |

Primary Examiner—Houston S. Bell, Jr.
Attorney—Arthur G. Gilkes, William T. McClain and John J. Connors

[57] ABSTRACT

Disclosed is a system for automatically fueling an automotive vehicle, comprising a movable fuel dispenser including nozzle which is adapted to be coupled to the fuel inlet of the vehicle, and programmable moving means connected to the fuel dispenser for moving the dispenser into a position where the nozzle can be coupled with the fuel inlet. On the vehicle are means which provide a signal indicating where the fuel dispenser should be moved relative to the fuel inlet. A detector actuated by this signal programs the moving means to move the dispenser to the correct fueling position.

12 Claims, 6 Drawing Figures

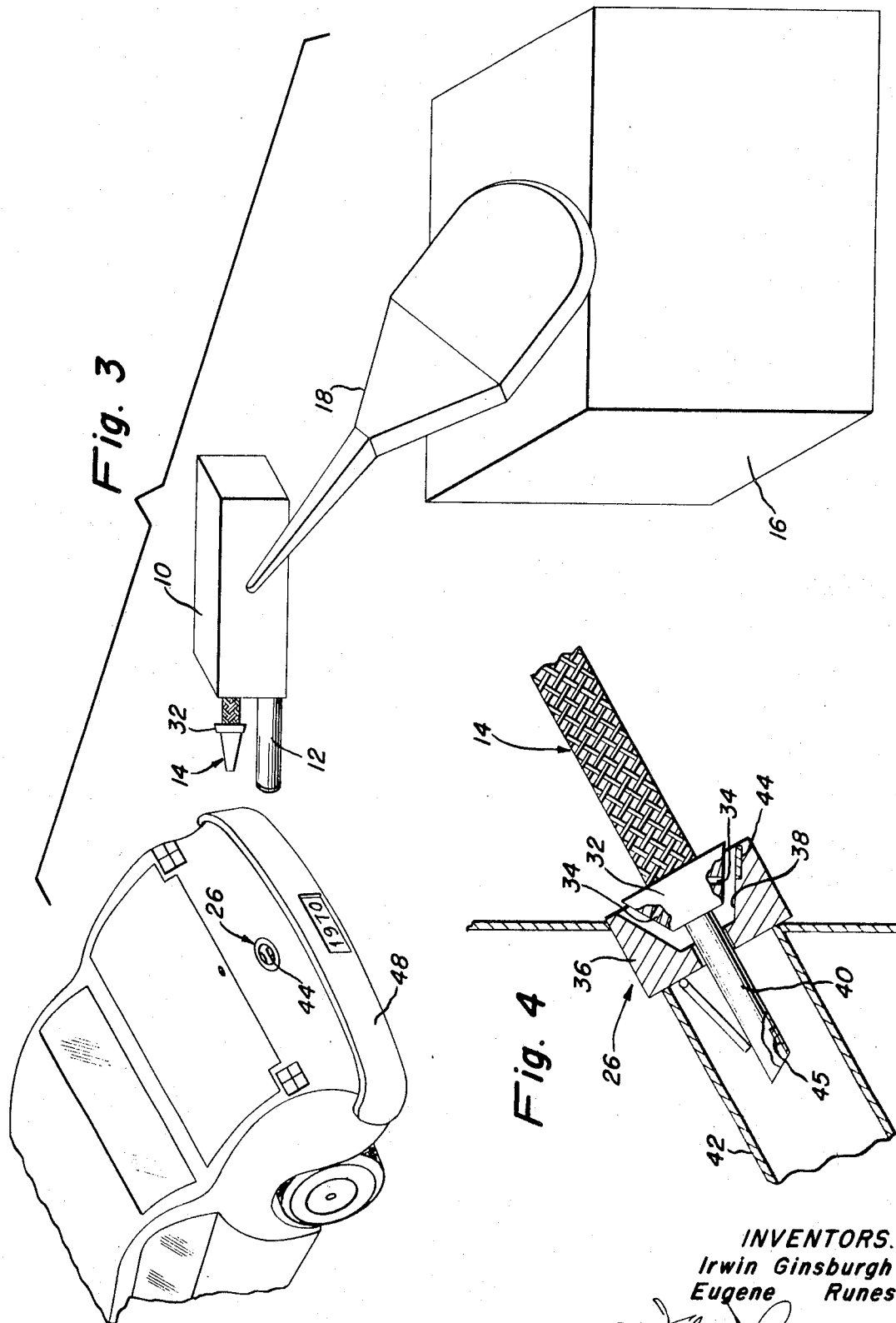

INVENTORS.
Irwin Ginsburgh
Eugene Runes
BY [signature]
ATTORNEY

AUTOMATIC FUELING SYSTEM FOR AUTOMOBILES

BACKGROUND OF THE INVENTION

U.S. Pat. Nos. 3,095,020 and 3,364,940 are representative of the state of the art. Conventionally, an automobile is located at a service position and a fuel dispenser is moved by mechanical means into a position opposite the fuel inlet of the vehicle. According to U.S. Pat. No. 3,095,020, a positioning arm contacts, for example, the wheel of the automobile to establish a reference position. Then the fuel dispenser is moved relative to this reference position in order to locate the vehicle's fuel inlet. According to U.S. Pat. No. 3,364,940, a console is provided which carries a number of buttons or switches through which the driver of the automobile exchanges location data by identification of the automobile's year, manufacturer, model, and body style. The console then controls the movement of the fuel dispenser in accordance with this data. We have now invented an improved system for automatically fueling an automobile, which employs means on the vehicle that provide a signal indicating the location of the fueling position. These means may be markings such as ultraviolet or infrared reflective strips, spots, etc. Alternately, they may be magnetic strips, spots, etc. The location and number of these markings designate the coordinants to which the dispenser must be moved for proper insertion of the fueling nozzle in the automobile's fuel inlet. The following drawings and accompanying description disclose the more important features of our invention.

DESCRIPTION OF DRAWINGS

FIG. 3 is a schematic perspective view showing the fuel dispenser being moved into the fueling position.

FIG. 4 is an enlarged detailed view in cross section showing the fueling nozzle inserted into the fuel inlet.

PREFERRED EMBODIMENT

General

Figure 1:
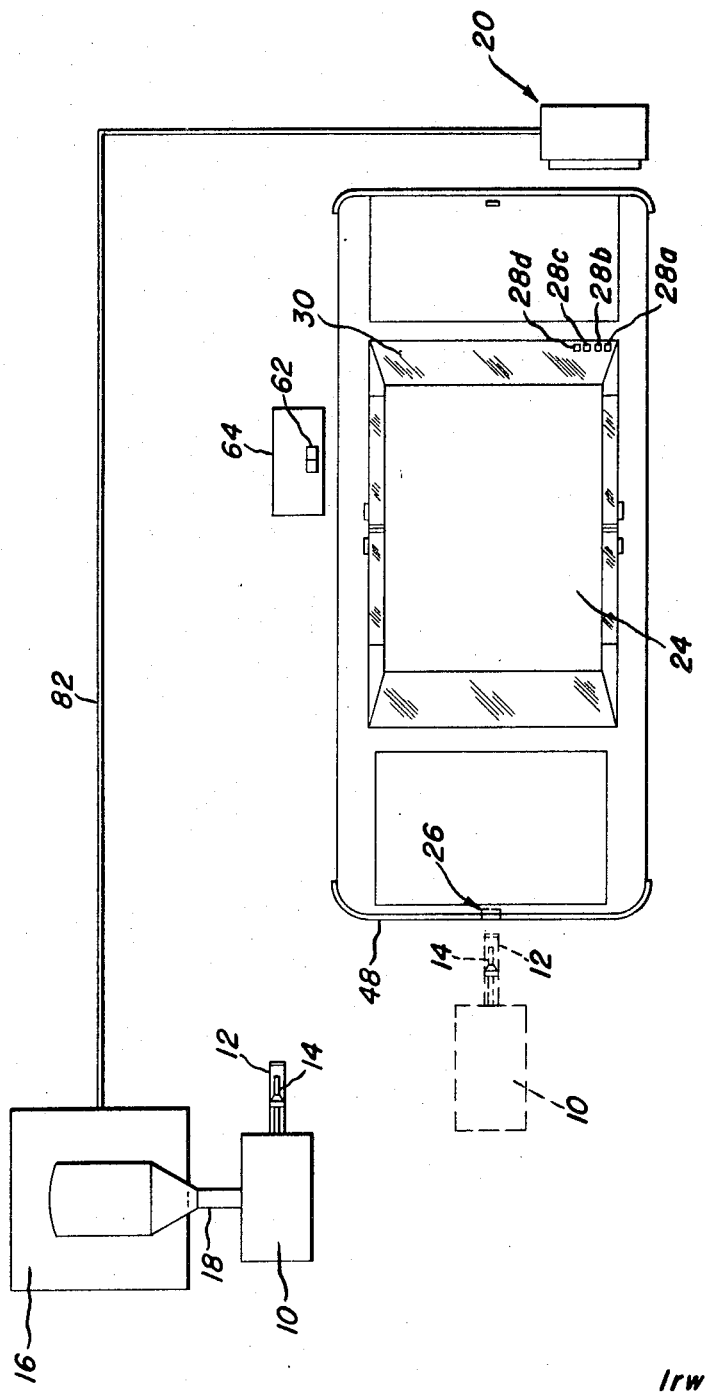
FIG. 1 is a schematic plan view showing fuel dispenser in a reference position ready to service an automobile located in a servicing position.
Figure 2:
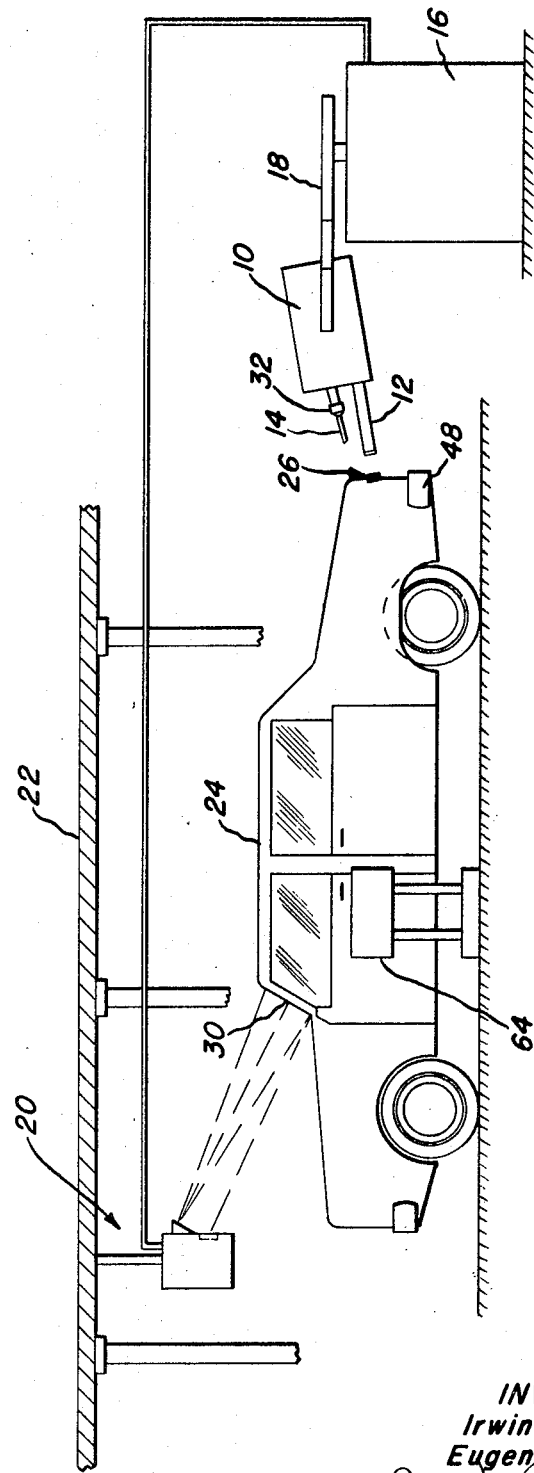
FIG. 2 is a schematic side view showing the fuel dispenser in a fueling position ready to insert the fueling nozzle into the automobile's fuel inlet.

The automatic fueling system of our invention, as depicted in FIGS. 1 and 2, includes (1) movable fuel dispenser 10 (connected to a fuel supply not shown) having searching head 12 and extendible nozzle 14, (2) robot 16 including extendible positioning arm 18 attached to dispenser 10 for moving the dispenser, and (3) fueling-position-locating and robot-programming means 20 suspended from roof 22 for controlling the operation of robot 16. Unimation Inc., of Danbury, Connecticut, makes robots suitable for use in our automatic fueling system. In FIG. 1, fuel dispenser 10 is shown in solid lines in a reference position and in dotted lines in a fueling position. Car 24, having fuel inlet 26 in the rear of the car, is shown in a servicing position. To aid the motorist in locating car 24 in the servicing position, our system may be equipped with vehicle positioning apparatus (not shown) such as disclosed in U.S. Pat. No. 3,391,651.

Positioning data for robot 16 is provided by data spots 28a–28 inconspicuously attached inside the windshield 30 of car 24. These spots are made of a light reflective material such as polished metal coated with beads that reflect light back toward its source. Ultraviolet or infrared reflective material can be used with corresponding light sources; however, an ultraviolet system is preferred. Thus when ultraviolet light floods windshield 30, spots 28a–28d will reflect some of this light toward fueling position locating and robot programming means 20. The number and pattern in which spots 28a–28d are arranged serve as the means of providing a data signal indicating where robot 16 should move fuel dispenser 10 for fueling of car 24. Spot 28a is the "start reading spot," and its function will be described later. Spots 28b to 28d are data spots, indicating the location of the fueling position for fuel dispenser 10. Of course, the fueling position will vary depending on the make and model of the car being fueled, and the number and position of spots 28a–28d will correspond to the parameters of the car being fueled. Additional spots may also be employed to include further programming information such as whether or not a flap opening operation need be performed, and/or whether or not the angle of inclination of nozzle 14 need be adjusted for correct entry into fuel inlet 26.

Fuel Dispensing

FIG. 3 shows fuel dispenser 10 in the fueling position before nozzle 14 has been extended and inserted into fuel inlet 26. Attached to nozzle 14 is a frustoconical mating member 32 which includes two fluidic proximity sensors 34 (FIG. 4). These sensors 34 sense when nozzle 14 has been properly inserted into fuel inlet 26.

As shown in FIG. 4, fuel inlet 26 includes mating member 36 having frustoconical recess 38 adapted to receive member 32 of nozzle 14. When nozzle 14 is inserted into fuel inlet 26, tube 40 of nozzle 14 extends into fill pipe 42 of car 24 and mating member 32 fits snugly into recess 38. Fill sensor 45 in the end of tube 40 provides a signal when fuel in fill pipe 42 begins to cover the end of tube 40.

Attached to member 36 of inlet 26 is means for providing a precision homing signal. For example, this means may include bar magnet 44 disposed so that the length of magnet is generally parallel to bumper 48 of car 24. The magnetic flux from magnet 44 provides a homing signal which searching head 12 seeks out. At the instigation of fueling-position-locating and robot-programming means 20, dispenser 10 is moved by robot 16 from the reference position to the approximate fueling position. At this point, control of the robot's operations is turned over to searching head 12, which then directs robot 16 to bring fuel dispenser 10 into a precise position relative to fuel inlet 26 to insure correct coupling of nozzle 14 and the inlet when the nozzle is extended. In searching head 12, precision locating and programming means 50 (FIG. 6) control the robot's operations for precise location of dispenser 10.

Fueling-Position-Locating and Robot-Programming Means

Figure 5:
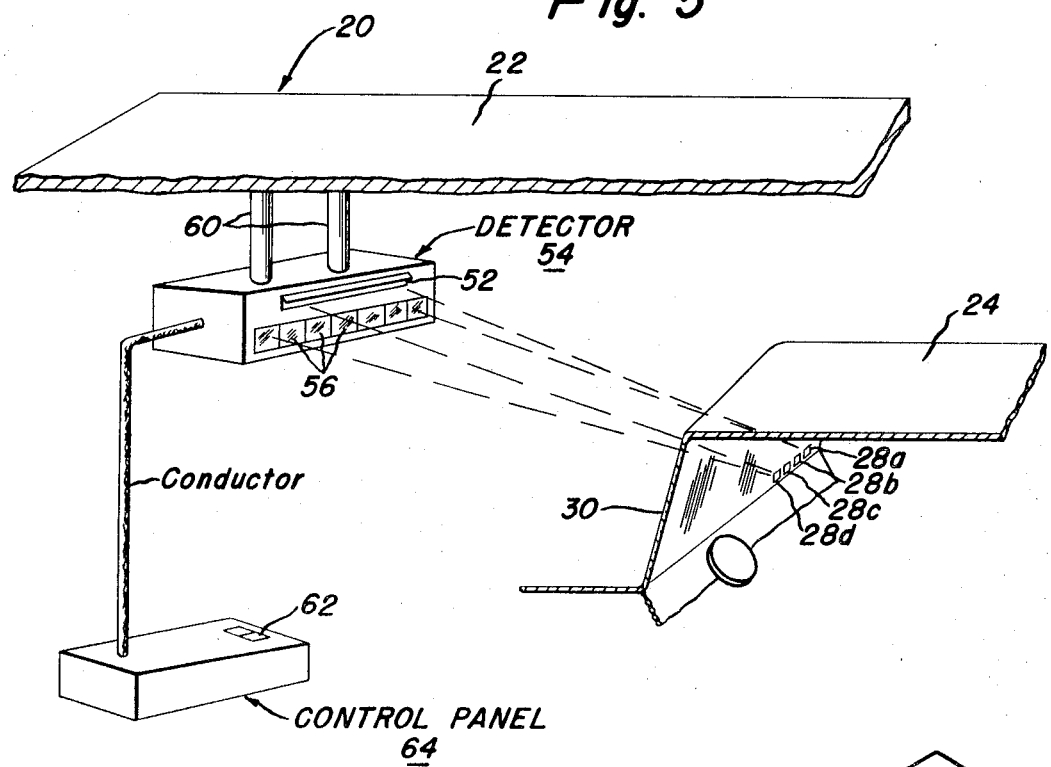
FIG. 5 is a schematic perspective view, with sections broken away, showing the fueling-position-locating and robot-programming means used in our system.

As shown in FIG. 5, fueling-position-locating and robot-programming means 20 includes ultraviolet lamp 52 and detector 54, including a bank of photocells 56. Means 20 is suspended from roof 22 by supports 60. Start switch 62 in control panel 64 adjacent the driver's side of car 24 is used by the motorist to turn on lamp 52 and energize detector 54. Lamp 52, when energized, floods windshield 30 with ultraviolet light which is reflected back by data spots 28a–28d. This reflected light strikes photocells 56 which in turn provide electrical impulses that are transmitted to robot 16 to provide location data for the robot's operations.

Precision Locating and Programming Means

Figure 6:
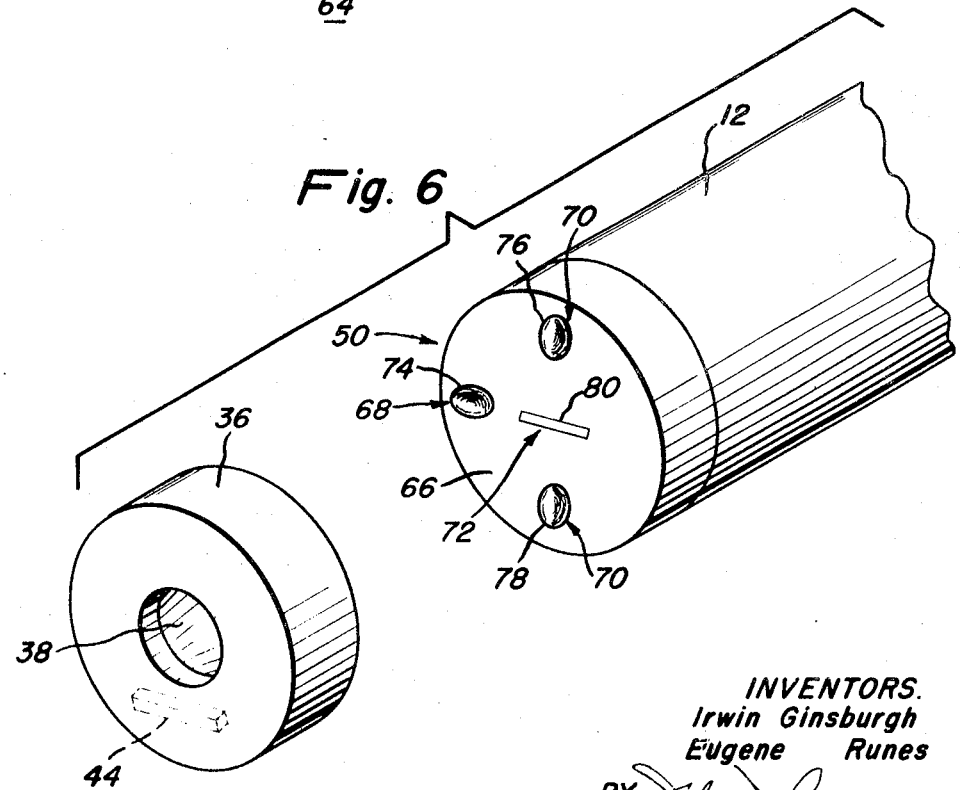
FIG. 6 is a schematic perspective view showing the searching head attached to the fuel dispenser.

As illustrated in FIG. 6, precision locating and programming means 50 are mounted in face 66 of searching head 12. These means 50 respond to the homing signal emanating from fuel inlet 26 to program robot 16 to move fuel dispenser 10 to the precise position for correct coupling of nozzle 14 and fuel inlet 26. Precision locating and programming means 50 includes three elements: proximity positioning programming means 68, height positioning programming means 70, and lateral positioning programming means 72.

Proximity positioning programming means 68 includes magnetic flux detector 74 which responds to the intensity of the magnetic flux from magnet 44. As searching head 12 moves toward fuel inlet 26, the intensity of the magnetic flux from magnet 44 increases. Flux detector 74 senses this increase, and at a predetermined position from fuel inlet 26 signals robot 16 to stop moving toward the inlet.

Height-positioning programming means 70 includes two magnetic flux detectors 76 and 78 spaced apart so that one can be above and one below magnet 44. When these flux detectors 76 and 78 are at equal distances above and below magnet 44, the intensity of the magnetic flux sensed by these detectors is exactly equal. This will signal robot 16 to discontinue further lifting or lowering of fuel dispenser 10.

Lateral positioning programming means 72 simply includes a magnetic flux detector 80 which has a length equal to the length of magnet 44. So long as flux detector 80 is not in registration with magnet 44 there will be one type of signal provided. However, when flux detector 80 is in exact registration with magnet 44, another type of signal will be provided indicating that the lateral movement of fuel dispenser 10 can be terminated.

Suitable magnetic flux detectors can be obtained from Hewlett Packard Corp.

Operation

The motorist first steers his car 24 into the servicing position, and then pushes start switch 62 on control panel 64. This turns on ultraviolet lamp 52 and energizes detector 54. Lamp 52 floods windshield 30 with ultraviolet light, and this ultraviolet light is reflected back by spots 28a–28d on the windshield. When reflected ultraviolet light strikes the bank of photocells 56 of detector 54, light reflected by the "start reading spot" 28a commences the reading and programming operation of detector 54. However, programming of robot 16 will only be started when the reflected light from spot 28a is identified by the detector. This prevents false readings because detector 54 will then know that all subsequently received light signals are from spots 28b–28d, which represent positioning data indicating where fuel dispenser 10 should be moved by robot 16.

Photocells 56 respond to the light signals to provide electrical impulses corresponding to the positioning data, and cable 82 transmits these impulses to robot 16. Robot 16 has an internal program responsive to these impulses for conducting automatic fueling operations. The first step of this program, which is initiated upon receiving the electrical impulses from detector 54, requires robot 16 to move fuel dispenser 10 to the position indicated by data spots 28a–28d. This will bring the fuel dispenser into an approximate fueling position next to fuel inlet 26. In the fueling position, searching head 12 is near inlet 26 but just below and just to the left of magnet 44 as viewed in FIG. 3. In this position, searching head 12 can respond to the precision homing signal provided by magnet 44.

With fuel dispenser 10 in the fueling position, the second step of the robot's program is now initiated. The second step calls for turning over control of robot 16 to precision locating programming means 50. Initially, proximity positioning programming means 68 of means 50 signals robot 16 to move fuel dispenser 10 toward fuel inlet 26 until it is in a predetermined position behind the fuel inlet. Flux detector 74 of this means 68 detects the intensity of the magnetic flux intensity, and when the flux reaches a predetermined level, flux detector 74 signals robot 16 to stop moving fuel dispenser 10 toward fuel inlet 26. Robot 16 moves fuel dispenser upwardly, lifting with it searching head 12 until magnet 44 is between flux detectors 76 and 78, equidistant from these detectors. At this point, the flux detected by these detectors 76 and 78 is of equal intensity. This signals robot 16 to stop moving fuel dispenser 10 upward. Control or robot 16 is now turned over to lateral positioning programming means 72 of means 50. These means 72 now program robot 16 to move laterally to the right until fuel dispenser 10 is in its proper lateral position relative to fuel inlet 10. When flux detector 80 is in exact lateral registration with magnet 44 so that its length is coextensive with the length of the magnet, it generates a signal indicating that fuel dispenser 10 is in the proper lateral position.

Fuel dispenser 10 is now in a precise fueling position so nozzle 14 can be extended and inserted into fuel inlet 26. Step three of the robot's program is now initiated to carry out this operation. Nozzle 14 is extended and mates with coupling member 36 of inlet 26, and when nozzle 14 is properly inserted into the fuel inlet, mating member 32 fits snugly into recess 38. Proximity sensors 34 now provide a signal which indicates that nozzle 14 is properly coupled with fuel inlet 26. This initiates the flow of fuel through nozzle 14 and into the fuel tank of car 24. When the fuel tank is full, fill sensor 45 in the end of nozzle 14 senses the level of fuel rising in fill pipe 42 and provides a signal for discontinuation of the flow of fuel. This signal also programs robot 16 to withdraw nozzle 14 and return dispenser 10 to the reference position.

We claim:

1. In a system for automatically fueling a parked automotive vehicle having a fuel inlet and wherein said vehicle is located in a predetermined servicing position, the combination comprising:
   movable fuel-dispensing means adjacent the servicing position, said fuel-dispensing means including nozzle means adapted to be coupled with said fuel inlet;
   programmable moving means connected to the fuel-dispensing means for moving said dispensing means into a fueling position where the nozzle means can be coupled with the fuel inlet;
   means on said vehicle providing a signal which indicates the location of the fueling position; and
   means responsive to the signal for programming said moving means to move the dispensing means into the fueling position so that the nozzle means correctly couples with the fuel inlet.

2. The system of claim 1 where the homing signal is ultraviolet radiation.

3. The system of claim 1 where the homing signal is infrared radiation.

4. The system of claim 1 where the homing signal is magnetic radiation.

5. The system of claim 1 where the means providing the homing signal includes one or more signal sources arranged in a pattern which indicates the coordinates of the fuel inlet.

6. The system of claim 1 where the programming means is at a fixed position in the system.

7. In a system for automatically fueling a parked automotive vehicle having a fuel inlet and means at the fuel inlet providing a homing signal, and wherein said vehicle is located in a predetermined servicing position, the combination comprising:
   movable fuel-dispensing means adjacent the servicing position, said fuel-dispensing means including nozzle means adapted to be coupled with said fuel inlet;
   programmable moving means connected to the fuel-dispensing means for moving said dispensing means into a fueling position where the nozzle means can couple with the fuel inlet;
   means responsive to the homing signal for programming said moving means to move the dispensing means into the fueling position so that the nozzle means correctly couples with the fuel inlet.

8. The system of claim 7 wherein the homing signal is ultraviolet radiation.

9. The system of claim 7 wherein the homing signal is infrared radiation.

10. The system of claim 7 wherein the homing signal is magnetic radiation.

11. The system of claim 7 where the programming means is connected to and moves with the fuel-dispensing means.

12. In a system for automatically fueling a parked automotive vehicle having a fuel inlet and means providing coarse signal indicating the general location of the fuel inlet and a precision homing signal indicating the exact location of the fuel inlet, the combination comprising:

movable fuel-dispensing means adjacent the servicing position, said fuel-dispensing means including nozzle means adapted to be coupled with said fuel inlet;

programmable moving means connected to the fuel-dispensing means for moving said dispensing means into a fueling position where the nozzle means can couple with the fuel inlet;

first means responsive to the coarse signal for programming said moving means to move the dispensing means into a position adjacent the fuel inlet; and second means responsive to the precision homing signal for programming said moving means to move the dispensing means into a coupling engagement with the fuel inlet so that nozzle means correctly couples with said fuel inlet.

* * * * *